(12) United States Patent
Siddaraju (10) Patent No.: US 9,384,020 B2
(45) Date of Patent: Jul. 5, 2016

(54) DOMAIN SCRIPTING LANGUAGE FRAMEWORK FOR SERVICE AND SYSTEM INTEGRATION

(71) Applicant: Unisys Corporation, Blue Bell, PA (US)

(72) Inventor: Srikantaiah Siddaraju, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/744,853

(22) Filed: Jan. 18, 2013

(65) Prior Publication Data
US 2014/0208294 A1 Jul. 24, 2014

(51) Int. Cl.
| | |
|---|---|
| G06F 9/44 | (2006.01) |
| G06F 9/46 | (2006.01) |
| G06F 17/24 | (2006.01) |
| G06F 9/455 | (2006.01) |
| G06F 17/30 | (2006.01) |
| G06F 17/21 | (2006.01) |

(52) U.S. Cl.
CPC ............. *G06F 9/45512* (2013.01); *G06F 8/30* (2013.01); *G06F 8/71* (2013.01); *G06F 17/30893* (2013.01); *G06F 9/45529* (2013.01); *G06F 17/211* (2013.01)

(58) Field of Classification Search
CPC ............. G06F 17/211; G06F 17/3089; G06F 17/30893; G06F 17/30917; G06F 9/45512; G06F 9/45529; G06F 9/4443; G06F 11/2294; G06F 11/3684; G06F 11/3672; G06F 11/368; G06F 8/30; G06F 8/71

See application file for complete search history.

(56) References Cited

U.S. PATENT DOCUMENTS

| | | | |
|---|---|---|---|
| 5,590,277 A | 12/1996 | Fuchs et al. | |
| 5,694,617 A | 12/1997 | Webb et al. | |
| 5,715,386 A | 2/1998 | Fulton et al. | |
| 7,403,948 B2 | 7/2008 | Ghoneimy et al. | |
| 7,523,447 B1 * | 4/2009 | Callahan ............. | G06F 11/3672 714/135 |
| 7,546,428 B1 | 6/2009 | McAndrews et al. | |
| 7,634,687 B2 | 12/2009 | Haselden et al. | |

(Continued)

OTHER PUBLICATIONS

Anders Moller et al., Interactive Web Services with Java, Apr. 2002, [Retrieved on Mar. 13, 2016]. Retrieved from the internet: <URL: http://www.brics.dk/NS/02/1/BRICS-NS-02-1.pdf> 102 Pages (1-102).*

(Continued)

*Primary Examiner* — Thuy Dao
*Assistant Examiner* — Anibal Rivera
(74) *Attorney, Agent, or Firm* — Robert P. Marley (57) ABSTRACT

Systems and methods are disclosed herein to a computer-implemented method of executing an enterprise application comprising: receiving, by a computer, an external request for a service provided by a runtime engine of the enterprise application; selecting, by a computer, a script from a plurality of scripts saved on a database based on the external request; referencing, by the computer, one or more tags stored in a tag library saved on the database that are called by the script, wherein the tags in the tag library define commands of the plurality of scripts and call one or more granular services of the enterprise application; loading, by a computer, the selected script and the tags referenced by the selected script; and executing, by a computer, instructions of the script to provide the service requested by the external request, wherein the selected script is updated in the database after executing instructions of the script.

23 Claims, 4 Drawing Sheets

(56) References Cited

U.S. PATENT DOCUMENTS

| | | | |
|---|---|---|---|
| 8,024,733 B2 | 9/2011 | Hambrick et al. | |
| 8,161,492 B2 | 4/2012 | Pinto et al. | |
| 8,365,015 B1 | 1/2013 | Yu et al. | |
| 8,589,883 B2* | 11/2013 | Demant et al. | 717/124 |
| 8,595,693 B2 | 11/2013 | Berg et al. | |
| 8,635,594 B1* | 1/2014 | Krishnan | G06F 9/45512 707/609 |
| 8,745,634 B2 | 6/2014 | Agarwal et al. | |
| 8,839,107 B2* | 9/2014 | Corville | G06F 3/023 715/704 |
| 2002/0120746 A1* | 8/2002 | Patil et al. | 709/227 |
| 2004/0003130 A1* | 1/2004 | Becker | G06F 17/30893 719/311 |
| 2004/0078373 A1 | 4/2004 | Ghoneimy et al. | |
| 2004/0268312 A1* | 12/2004 | Abe et al. | 717/124 |
| 2005/0177066 A1* | 8/2005 | Aharonson | A61B 5/162 600/559 |
| 2005/0256826 A1 | 11/2005 | Hambrick et al. | |
| 2005/0257227 A1* | 11/2005 | Ritchy | G06F 9/4443 719/328 |
| 2006/0095835 A1* | 5/2006 | Kennedy | G06F 17/211 715/234 |
| 2006/0200439 A1* | 9/2006 | Bhatia | G06F 17/30917 |
| 2006/0200753 A1* | 9/2006 | Bhatia | G06F 17/30893 715/203 |
| 2009/0037881 A1* | 2/2009 | Christy | G06F 11/3684 717/124 |
| 2009/0307763 A1* | 12/2009 | Rawlins | G06F 11/2294 726/5 |
| 2011/0178980 A1* | 7/2011 | Wagner | G06Q 20/00 707/607 |
| 2011/0179398 A1* | 7/2011 | Peterson | G06F 9/45512 717/115 |
| 2011/0246725 A1 | 10/2011 | Moir et al. | |
| 2011/0289484 A1* | 11/2011 | Caine | G06F 8/30 717/127 |
| 2011/0301996 A1* | 12/2011 | Johnson | G06Q 10/06 705/7.26 |
| 2012/0023484 A1* | 1/2012 | Demant | G06F 8/38 717/125 |
| 2012/0159439 A1* | 6/2012 | Kaplinger | G06F 8/71 717/121 |
| 2012/0291005 A1* | 11/2012 | Quine | G06F 9/45529 717/105 |
| 2013/0159974 A1* | 6/2013 | Norton | G06F 11/3684 717/124 |
| 2013/0238970 A1* | 9/2013 | Getzin | G06F 17/3089 715/234 |
| 2013/0275806 A1 | 10/2013 | Busaba et al. | |
| 2013/0346947 A1* | 12/2013 | Braverman | G06F 11/368 717/124 |
| 2014/0279919 A1 | 9/2014 | Sygulla et al. | |

OTHER PUBLICATIONS

Changtao Quet al., A Collaborative Courseware Generating System Based on WEBDAV, XML, and JSP, 2001, [Retrieved on Mar. 13, 2016]. Retrieved from the internet: <URL: http://ieeexplore.ieee.org/stamp/stamp.jsp?tp=&arnumber=943898> 2 Pages (197-198).*

* cited by examiner

DOMAIN SCRIPTING LANGUAGE FRAMEWORK FOR SERVICE AND SYSTEM INTEGRATION

CROSS-REFERENCE TO RELATED APPLICATIONS

This non-provisional patent application is related to U.S. patent application Ser. No. 13/744,882, filed Jan. 18, 2013, entitled "DOMAIN SCRIPTING LANGUAGE FRAMEWORK FOR SERVICE AND SYSTEM INTEGRATION," filed on even date herewith, the entire contents of which are hereby incorporated herein by reference in their entirety.

TECHNICAL FIELD

The present invention relates generally to enterprise applications, and more specifically to an scripting language architecture for an enterprise application.

BACKGROUND

Conventional enterprise applications may be compiled and deployed with a separate workflow layer that is responsible for orchestrating business flow and coordinating services. The workflow layer gives the conventional enterprise application functionality. After an enterprise application is deployed, a customer may desire changes to the functionality, workflow, or services provided by the enterprise application, which are unpredicted during system design. Any changes to the functionality, workflow, or services of the conventional enterprise application require a change to the workflow layer or in granular service layers. In order to make a change to the workflow layer or the granular service layer, the enterprise application must be disabled, recompiled, and redeployed. Changes requiring recompilation of the workflow layer are costly and require a significant amount of time to implement. Costly and time-consuming changes frustrate a customer and may lead the customer to decide against making enterprise application changes unless the changes are very important.

Further, in a conventional enterprise application, any faults in the workflow, implementation or system components may lead to serious errors or system slow down to address the faults. Fault management in modern enterprise applications must be fast and accurate so that no faults occur during normal operation and faults do not seriously burden any users of the enterprise application.

Thus, a business application having flexibility after deployment, good performance, and good fault management is desired for enterprise applications.

SUMMARY

The systems and methods described herein attempt to overcome the drawbacks discussed above by providing a domain scripting language based architecture saved on a database and implemented by a runtime engine of an enterprise application. The runtime engine receives external requests for services provided by the enterprise application. The runtime engine processes the requests and calls one of a plurality of scripts located on the database to give the runtime engine workflow. Thus, updating the scripts on the database changes the workflow of the enterprise application after deployment rather than by recompiling and redeploying a workflow layer.

In addition, the scripts may be wrapped by a "savepoint" feature configured to restart the script at a point before a fault occurred. The savepoint feature creates snapshots during the execution of the scripts for reliable fault management.

In one embodiment, a computer-implemented method of executing an enterprise application comprises: receiving, by a computer, an external request for a service provided by a runtime engine of the enterprise application; selecting, by a computer, a script from a plurality of scripts saved on a database based on the external request; referencing, by the computer, one or more tags stored in a tag library saved on the database that are called by the script, wherein the tags in the tag library define commands of the plurality of scripts and call one or more granular services of the enterprise application; loading, by a computer, the selected script and the tags referenced by the selected script; and executing, by a computer, instructions of the script to provide the service requested by the external request, wherein the selected script is updated in the database after executing instructions of the script.

In another embodiment, a computer-implemented method of updating an enterprise application comprises: deploying, by a computer, a runtime engine of the enterprise application; storing, by a computer, a script and a tag library, wherein the script defines a workflow of the enterprise application when loaded by the runtime engine, and the tag library comprises tags that define commands executed by the script to call and control granular services; executing, by a computer, the script using the runtime engine to perform a first workflow; changing, by a computer, the script; uploading, by a computer, the changed script to the database; and executing, by a computer, the changed script using the runtime engine to perform a second workflow that is different than the first workflow.

In another embodiment, a computer program product for executing an enterprise application comprises a non-transient computer readable medium having a computer readable program, wherein the computer readable program includes a runtime engine that when executed on a processor causes a computer to: receive an external request for a service provided by the enterprise application; select a script from a plurality of scripts saved on a database based on the external request; reference one or more tags stored in a tag library saved on the database that are called by the script, wherein the tags in the tag library define commands of the plurality of scripts and call one or more granular services of the enterprise application; load the selected script and the tags referenced by the selected script; and execute instructions of the script to provide the service requested by the external request.

In another embodiment, a computer-implemented method of fault management for an enterprise application comprises: executing, by a computer, a script by a runtime engine to provide a workflow for the enterprise application, wherein the script includes a limit management feature; determining, by a computer, that an error has occurred during the workflow specified by the script; creating, by a computer, a snapshot of a state of workflow determining that an error occurred and saving the snapshot in a database, wherein the snapshot is a placeholder of a point in the workflow before the error occurred and processed data of the workflow with any updates to the processed data that occurred during or after the error removed; stopping, by a computer, the workflow specified by the script; and moving, by a computer, the snapshot into a fault queue.

In another embodiment, a computer program product for executing a fault management feature of an enterprise application comprises a non-transient computer readable medium having a computer readable program, wherein the computer readable program includes a runtime engine that when executed on a processor causes a computer to: execute a script by a runtime engine to provide a workflow for the enterprise application, wherein the script includes a fault management feature; determine that an error has occurred during the workflow specified by the script; create a snapshot of a state of the workflow determining that an error occurred and saving the snapshot in a database, wherein the snapshot is a placeholder of a point in the workflow before the error occurred and processed data of the workflow with any updates to the processed data that occurred during or after the error removed; stop the workflow specified by the script; and move the snapshot into a fault queue.

In another embodiment, a fault management system comprises: a processor configured to execute a script having a fault management feature to provide a workflow for the enterprise application, determine that an error has occurred during the workflow specified by the script; create a snapshot, saving the snapshot in a database, stop the workflow of the script, and move the snapshot into a fault queue; the database connected to the processor configured to save the snapshot of a state of a workflow in a fault queue, wherein the snapshot is a placeholder of a point in the workflow before an error occurred and processed data of the workflow with any updates to the processed data that occurred during or after the error removed; and a computer readable medium used by the processor to execute commands of the script.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and an embodiment of the invention and together with the specification, explain the invention.

DETAILED DESCRIPTION

Reference will now be made in detail to the preferred embodiments, examples of which are illustrated in the accompanying drawings.

The embodiments described above are intended to be exemplary. One skilled in the art recognizes that numerous alternative components and embodiments that may be substituted for the particular examples described herein and still fall within the scope of the invention.

Figure 1:
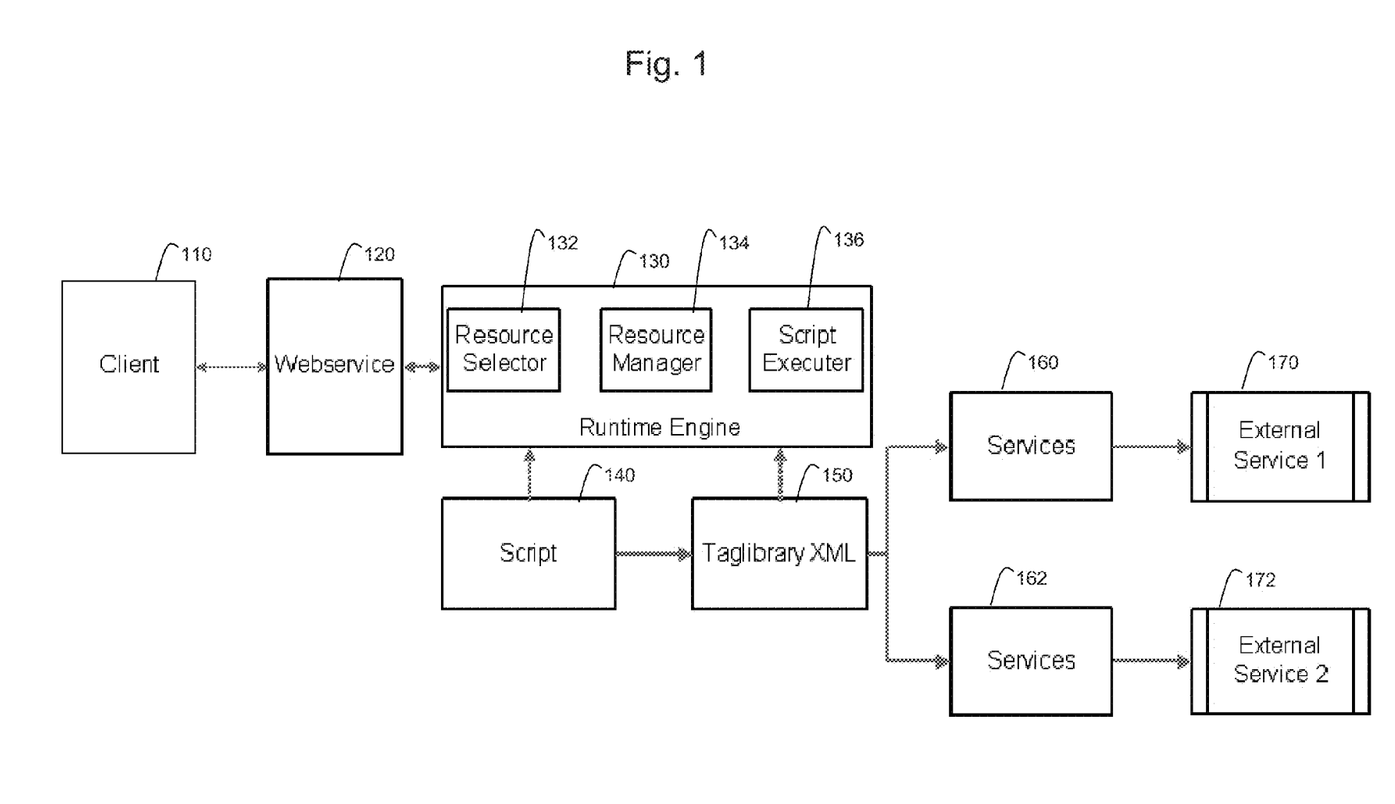
FIG. 1 illustrates a logical overview of the domain scripting language based enterprise application architecture according to the exemplary embodiments.

FIG. 1 illustrates a logical overview of the domain scripting language (DSL) based enterprise application architecture. As shown in FIG. 1, a client device 110 sends a request to a runtime engine 130 through a web service 120. The client device HO may be a client computer, a server, a smart phone, a tablet or any other computing device capable of sending requests to the runtime engine 130. For example, the runtime engine 130 may run on an application server executing commands from a tangible computer-readable medium. The application server executing the runtime engine 130 may be connected to a network, such as the internet, and may receive the requests from the client device 110 through the network. The runtime engine 130 uses the web service 120 implemented as a server to receive requests over the World Wide Web, and the web service 120 may be omitted or replaced by a different network service if the runtime engine 130 does not receive requests over the World Wide Web. The runtime engine 130 may be the controller of an enterprise application, and the runtime engine 130 organizes and executes business workflow by using a script 140 and tags from a tag library 150. The runtime engine 130 includes a number of modules: a resource selector 132, a resource manager 134, and a script executor 136. The resource selector 130 selects one of a plurality of the scripts 140 based on the request from the client device 110. Once the resource selector 132 selects a proper script 140, the resource selector references the tag library 140 to find definitions for the commands called by the selected script 140. The tags in the tag library 150 define the functionality of the commands specified by the script 140. The resource manager 134 converts the requests from the client device 110 into a format understood by the runtime engine 130 to process the requests. The resource manager 134 may further create execution context for each execution. Each execution may have an independent execution context regardless of the type of request.

For example, a database, which may be an SQL, OQL, XQuery, or any other type of database, stores the scripts 140 and the tag library 150. One database may store both the scripts 140 and the tag library 150, or multiple databases may store the script 140 and the tag library 150. A customer or an information services company may control the database. If an information services company controls the database, the customer may request a change in the business workflow of the enterprise application from the information services company, and the information services company may provide and upload the update of the scripts 140 or the tag library 150 to the database without inconveniencing the customer.

Scripts 140 give the runtime engine business flow. The scripts 140 may be written in a domain scripting language, and definitions for commands called by the domain scripting language may be saved as tags in the tag library 150. The tag library 150 may contain language commands and custom commands. The language commands are not customer specific and define operations across the enterprise application in order to build the domain scripting language. The custom commands may be customer specific and may be used for customer-specific services and services.

The tag library 150 includes tags used by the scripts 140 to call underlying granular services 160, 162, such as plain-old java objects (POJO) or other granular services. In other words, the tags of the tag library 150 give the enterprise application implementation. The granular services 160, 162 interface external services 170, 172 to perform the features of the enterprise application. For example, the external services 170, 172 may be biometric engines that validate a user after receiving biometric data. More specifically, the external services 170, 172 may be an engine and plug-in that receives data from a commercial off-the-shelf product configured to gather biometric information by reading the iris of a person accessing a security check point.

A tag may be written, for example, using Groovy or Smooks, and the tags contain commands necessary to call the granular services 160, 162 that execute the external services 170, 172. Groovy is a programming language for the Java platform commonly used for writing scripts because it natively supports markup languages such as XML, and because a Groovy script is fully parsed, compiled, and generated before execution. Smooks is a framework for building applications for processing XML and non-XML (CSV, EDI, Java) data using Java. Smooks includes a transformation function that performs a wide range of data transforms such as XML to EDI, XML to Java, or EDI to Java. The tools and features of Groovy and Smooks assist in making changes to the scripts 140 and tags quickly. As discussed above, the resource manager 134 translates external requests into a language understood by the runtime engine 130, and existing Smooks tools and features may perform this transformation process.

When the runtime engine 130 receives an external request from the client device 110, the resource manager 132 converts the request into a data format used by the runtime engine 130 to process external requests. For example, the resource manager 132 may convert an XML, EDI, or CSV external request to a java object understood by the runtime engine 130. After the runtime engine 130 processes the request, the resource selector 132 selects a script from a plurality of scripts in the database based on the external request. The resource selector 132 loads the script 140 only once and loads the script 140 into cache memory to increase performance. Once the runtime engine 130 loads a script 140 from the database, the resource selector 132 also determines and receives the tags from the tag library 150 defining commands in the script 140. After receiving, loading, and compiling the script 140 and corresponding tags, the runtime engine 130 executes the script using the script executer 136. The script executor follows the business workflow of the loaded script 140 and follows the definitions of the tags from the tag library 150 to command services 160, 162. To further increase performance, the runtime engine 130 may only store data to a hard disk when there is a manual step or if an error has been raised.

As can be seen in FIG. 1, a plurality of scripts 140 executed by the runtime engine 130 replaces the workflow layer. Thus, changing the workflow of the enterprise application is simple and fast. The workflow or implementation of the enterprise application may be changed simply by changing the scripts 140 and tag library 150 in the database. The runtime engine 130 is not changed or recompiled, but instead the scripts 140 and tags change to update the business workflow of the enterprise application. Also, new workflows may be added by adding a new scripts 140. Also, additional services may be added by adding new definitions to the tag library 150. Making changes to the scripts 140 causes the scripts 140 to use new tags to implement the new functionality. Also, and perhaps more importantly, changes to one tag or script 140 can be made without affecting other tags, services, and scripts 140. After making a change to the scripts 140 or the tag library 150 and uploading the new or updated scripts 140 and tags to the database, the runtime engine 130 executes the new business workflow by loading the new or updated script 140.

Figure 2:
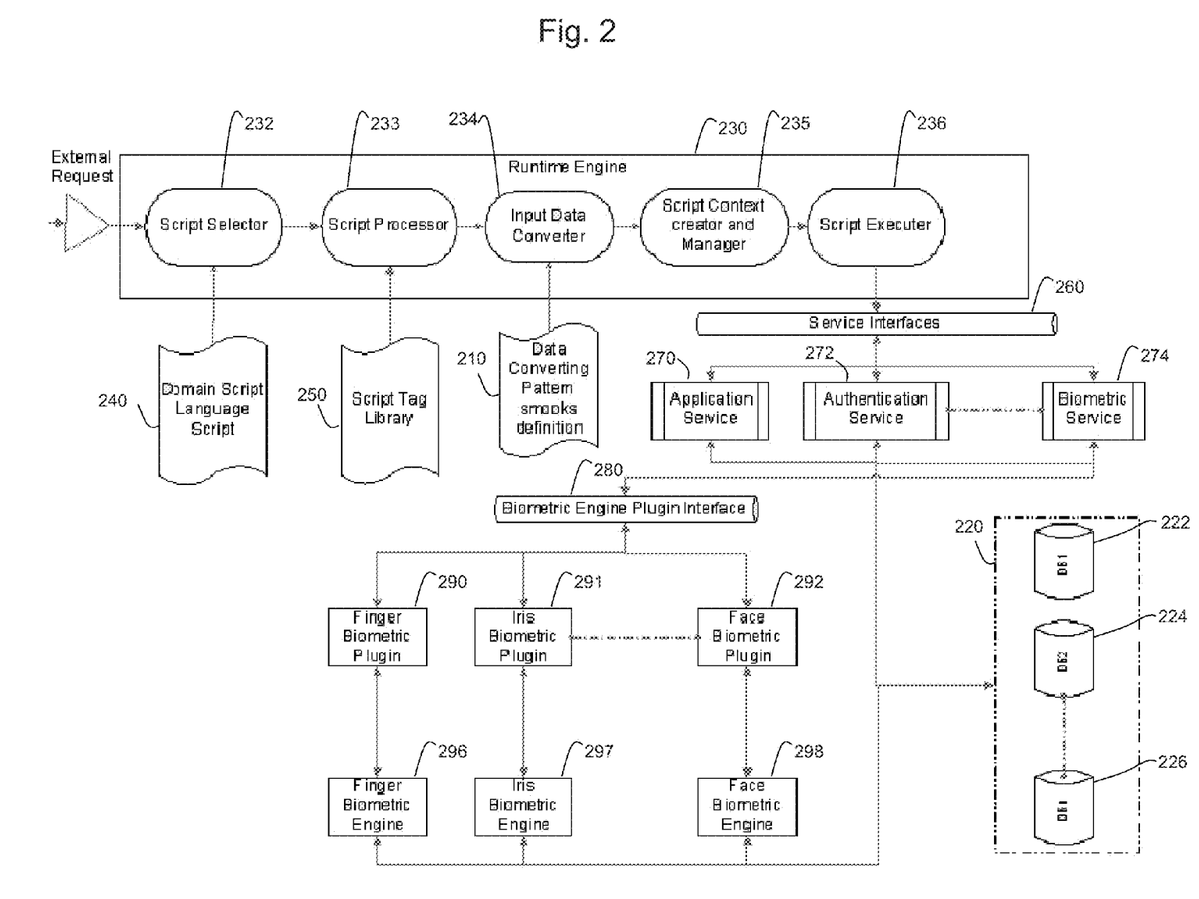
FIG. 2 illustrates the domain scripting language applied to a biometric system according to the exemplary embodiments.

FIG. 2 illustrates an exemplary domain scripting language used in a biometric identification enterprise application for illustration purposes. As shown in FIG. 2, a script selector 232 (which may be part of the resource selector 132 of FIG. 1) selects a script from the plurality of scripts 240 based on an external request. A script processor 233 (which may be part of the resource selector 132 of FIG. 1) loads a series of commands from the selected script 240 and compiles the script 240 by referencing tags from the script tag library 250 that define the commands of the script 240. An input data converter 234 (which may be part of the resource manager 134 of FIG. 1) receives the external request and converts the external request, which may be in XML, CSV, or another data format, using a data converting pattern Smooks definition 210. A script context creator and manager 235 creates an execution context for each execution. After the script 240 and tags are loaded, a script executor 236 executes the instructions of the script 240. Following the instructions of the script 240, the script executor 236 may need to implement one or more services from a plurality of services 270, 272, 274 through a service interface 260. The services 270, 272, 274 may call for external services such as a fingerprint biometric plug-in 290, an iris biometric plug-in 291, and a facial recognition biometric 292 that respectively communicate with a fingerprint biometric engine 296, an iris biometric engine 297, and a facial recognition biometric engine 298. Any call to the plug-ins 290, 291, 292 may be made through a plug-in interface 280. Alternatively, the services 270, 272, 274 may reference data stored in a database 220, which may include a plurality of databases 222, 224, 226.

More specifically, the external request may be a request to enroll a new user into the biometric system shown in FIG. 2. The script selector 232 selects the corresponding script 240 that generates the workflow for enrolling a new user. Enrolling a new user may include saving a person's name, address, birthday, etc., in one of the databases 222, 224, 226 using, for example, the application service 270. Enrolling a new user may further include obtaining a biometric reading for the person, such as by uploading a fingerprint reading using the fingerprint plug-in 290 and the fingerprint engine 296 after calling the biometric service 274. After the biometric system collects the fingerprint readings, the biometric data for the user may be saved in one of the databases 222, 224, 226 by, again, using the application service 270. The selected script 240 controls the enrollment business workflow including inputting a person's information (name, birthday, address, etc.) followed by inputting biometric readings for the person. The tag library 250 may define any commands of the services 270, 272, 274 or calls to the external services 290, 291, 292.

As another example, the external request may be a request to verify a user using biometric information. Verifying a user may involve the business flow of collecting a fingerprint reading from a user requesting to be verified, comparing the collected reading with fingerprint data stored in one of the databases 222, 224, 226, and providing access to a secured resource if the collected fingerprint matches a stored fingerprint. These steps, and any intermediary steps necessary to perform user verification, may be controlled by the commands listed in a user verification script 240. The script selector 232 calls the user verification script 240, the script executor 236 performs the instructions of the script 240, and the services 270, 272, 274 called by the script 240 are performed.

The examples above described a situation where only fingerprints were collected to biometrically identify an enrolled user. As a customer's needs change, the customer may decide that fingerprints are inefficient or not providing enough security. As a result, the customer may decide to replace fingerprint biometrics services with iris biometrics services, or decide to add iris biometrics services in addition to existing fingerprint biometric services. In the example where iris biometric services replace fingerprint biometric services, the tags of the tag library 250 simply may be changed so that the iris services 291, 297 are referenced instead of the fingerprint services 290, 296. In the example where iris biometric services 291, 297 are added to existing fingerprint biometric services 290, 296, the scripts 240 may be changed to add in the iris biometric services 291, 297 as part of the workflow. In either case, only the tags and scripts 240 need be updated in the database that saves the scripts 240 and the tag library 240, and the next time the runtime engine 230 calls one of the scripts 240, the runtime engine performs the new and updated workflows.

While the example of a biometric enrollment and verification system has been described for exemplary purposes, those skilled in the art should recognize that the domain scripting language framework can be applied to any enterprise application containing a workflow layer. The scripts and tag library described above may be used to replace the workflow layer of any enterprise application for adaptability and flexibility after deployment. For example, the domain scripting language framework may replace the workflow layer in accounting software for a business, master data management for a government agency, or business process management applications.

Figure 3:
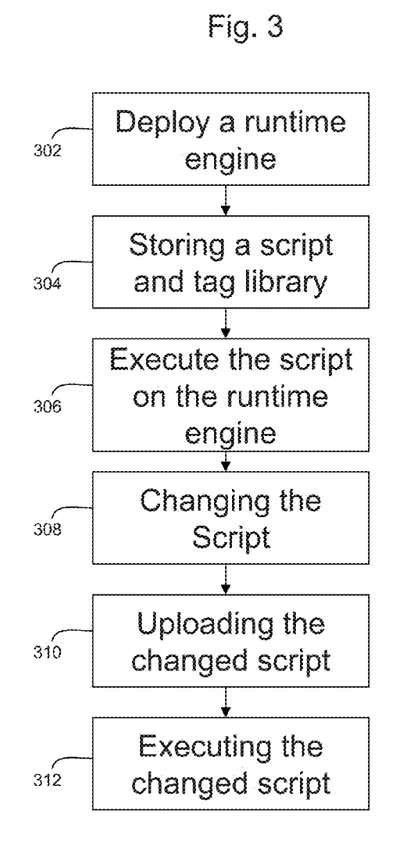
FIG. 3 illustrates a method of changing a script and updating a workflow according to the exemplary embodiments.

FIG. 3 illustrates a method of changing a script and updating a workflow. The method begins in step 302 when a runtime engine of the enterprise application is deployed. Deploying a runtime engine may include the steps of compiling the entire runtime engine and starting the processes of the runtime engine. According to the exemplary embodiments, the goal is to only compile and deploy the runtime engine once in the lifetime of the runtime engine. In step 304, a script and a tag library are stored in a database. The script defines a workflow of the enterprise application when loaded by the runtime engine, and the tag library comprises tags that define commands executed by the script to call and control granular services. After the runtime engine selects a script and downloads the script from the runtime engine, the runtime engine executes the script to perform a first workflow. Subsequent to executing the script, a customer may desire a second workflow that is different than the first workflow. To generate the second workflow, the script controlling the first workflow is changed in step 308. After the script is rewritten, the changed script is uploaded to the database in step 310. Once the new script is uploaded to the database, the runtime engine can select the changed script, load it, and execute the changed script to perform a second workflow that is different than the first workflow in step 312.

While the runtime engine 230 performs the business workflows by using the scripts 240, reliable fault management remains important for accurate data processing and data integrity. To perform fault management, every script 240 may include a feature, which may be called savepoint, that creates a snapshot of the execution that resides in a messaging queue or database in case of execution failures. A snapshot may include all processed data, after removing any updates during or after the error occurred, and a pointer that points a specific point in a workflow before the error occurred. The execution of the workflow may continue from the snapshot point saved in the messaging queue or database after correcting any problems.

Figure 4:
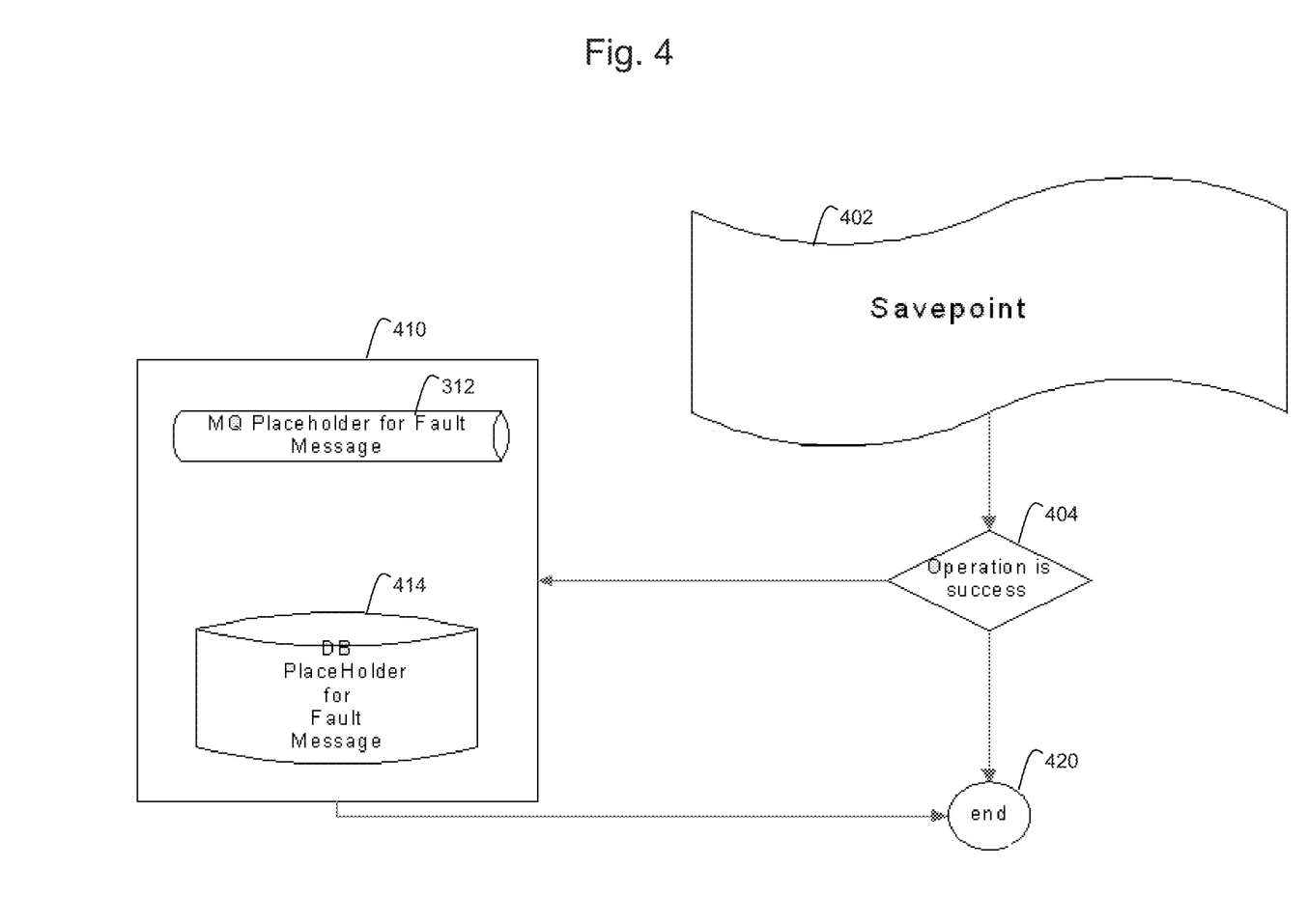
FIG. 4 illustrates a fault management method according to the exemplary embodiments.

The savepoint feature may be a tag included in the tag library 250. FIG. 4 illustrates the process of the savepoint feature. As shown in FIG. 4, the savepoint feature 402 determines if a previous instruction statement contained any errors in step 404. If no error occurs at step 404, the savepoint feature ends in step 420. If any error occurred, savepoint creates a placeholder and a snapshot for the fault message and saves the placeholder in either the messaging queue in step 412 or the database in step 414. The placeholder created in either step 412 or 414 is the snapshot described above. The script may retry the executed step where the fault occurred a configurable number of time, and the job may be moved into a fault queue if the retries fail.

Using the savepoint feature, an engine can stop immediately, and then resume from the point of a fault. When an error occurs, the runtime engine 230 creates a snapshot, identifies and remedies issues, references the placeholder, and continues the workflow from the point pointed to by the placeholder. By implementing fault management this way, a workflow does not need to be completely performed again, and messages and data from the first iteration of the workflow, which had a fault, are not lost.

Further, by using the savepoint feature, the runtime engine 230 can identify faulty equipment if fault messages are becoming numerous at one location in the workflow.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "generating" or "synchronizing" or "outputting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMS) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. Uric skilled in the art recognizes that numerous alternative components and embodiments that may be substituted for the particular examples described herein and still fall within the scope of the invention.

What is claimed is:

1. A computer-implemented method of executing an enterprise application, the method comprising:
   receiving, by a computer, an external request from a client device for a service provided by a runtime engine of the enterprise application, wherein the runtime engine runs on the computer;
   automatically selecting, by the computer via the runtime engine, a script from a plurality of scripts saved on a database based on the external request;
   referencing, by the computer via the runtime engine, one or more tags stored in a tag library saved on the database that are called by the selected script, wherein the one or more tags in the tag library define commands of the plurality of scripts and call one or more granular services of the enterprise application;
   loading, by the computer via the runtime engine, the selected script and the one or more tags referenced by the selected script; and
   executing, by the computer via the runtime engine, instructions of the loaded script based on the one or more tags to provide the service to the client device as requested by the external request, wherein the selected script is updated in the database after executing instructions of the loaded script.

2. The computer-implemented method of claim 1, wherein the selected script and the referenced tags are loaded into a cache memory of a computer.

3. The computer-implemented method of claim 1, wherein the selected script is selected by a script selector module of the runtime engine.

4. The computer-implemented method of claim 1, wherein tile external request is transformed into a data format used by the runtime engine by a data converting module of the runtime engine.

5. The computer-implemented method of claim 4, wherein the external request is transformed into a Java Object.

6. The computer-implemented method of claim 1, wherein the tags include language tags defining general operations of the enterprise application and custom commands defining customer-specific commands and services.

7. The computer-implemented method of claim 1, wherein the external request is received through a web service and the external request is sent over the World Wide Web.

8. The computer-implemented method of claim 1, wherein the tags in the tag library are written using Smooks or Groovy.

9. The computer-implemented method of claim 1, wherein the runtime engine stores data to a hard disk only when there is a manual step or when an error is raised.

10. The computer-implemented method of claim 1, wherein the runtime engine is not recompiled or redeployed based on the updating of the selected script.

11. A computer-implemented method of updating an enterprise application, the method comprising:
    deploying, by a computer, a runtime engine of the enterprise application, wherein the runtime engine runs on the computer;
    retrieving, by the computer via the engine, a script and a tag from one or more databases, wherein the tag is stored in a tag library on the one or more databases, wherein the retrieved script defines a workflow of the enterprise application when the retrieved script is loaded by the runtime engine, and the tag library comprises tags that define commands executed by the script to call and control granular services;
    executing, by the computer, the loaded script with the tag using the runtime engine to perform a first workflow;
    changing, by the computer, the loaded script after the executing, wherein the changed script is stored in the one or more databases:
    retrieving, by the computer via the runtime engine, the changed script from the one or more databases; and
    executing, by the computer, the changed script using the runtime engine, without changing or recompiling the runtime engine to execute the changed script form performance of the first workflow, to perform a second workflow that is different than the first workflow, wherein performance of the second workflow is based on a request received by the computer from a client device.

12. The computer implemented method of claim 11, wherein changing the script includes adding steps to the first workflow, removing steps from the first workflow, changing the order of the steps of the first workflow, or changing the granular services called by the first workflow.

13. The computer implemented method of claim 11, further comprising,
    changing, by a computer, the tags in the tag library; and
    uploading, by a computer, the changed tag library.

14. The computer-implemented method of claim 13, wherein changing the tags in the tag library includes changing the granular services called by a command, adding a command, removing a command, or changing how a granular service is commanded.

15. A computer program product for executing an enterprise application comprising a non-transient computer readable medium having a computer readable program, wherein the computer readable program includes a runtime engine that when executed on a processor causes a computer to:
- receive an external request from a client device for a service provided by the enterprise application, wherein the runtime engine runs on the computer;
- automatically select, via the runtime engine, a script form a plurality of scripts saved on a database based on the external request;
- reference, via the runtime engine, one or more tags stored in a tag library saved on the database that are called by the selected script, wherein the one or more tags in the tag library define commands of the plurality of scripts and call one or more granular services of the enterprise application;
- load, via the runtime engine, the selected script and the one or more tags referenced by the selected script; and
- execute, via the runtime engine, instructions of the loaded script to provide the service to the client device as requested by the external request.

16. The computer program product of claim 15, wherein the selected script and the referenced tags are loaded into a cache memory of a computer.

17. The computer program product of claim 15, wherein the selected script is selected by a script selector module of the runtime engine.

18. The computer program product of claim 15, wherein the external request is transformed into a data format used by the runtime engine by a data converting module of the runtime engine.

19. The computer program product of claim 18, wherein the external request is transformed into a Java Object.

20. The computer program product of claim 15, wherein the tags include language tags defining general operations of the enterprise application and custom commands defining customer-specific commands and services.

21. The computer program product of claim 15, wherein the external request is received through a web service and the external request is sent over the World Wide Web.

22. The computer program product of claim 15, wherein the tags in the tag library are written using Smooks or Groovy.

23. The computer program product of claim 15, wherein the runtime engine stores data to a hard disk only when there is a manual step or when an error is raised.

* * * * *